United States Patent [19]

Le Mong

[11] Patent Number: 4,606,491
[45] Date of Patent: Aug. 19, 1986

[54] PROCESS FOR SEALING A LEAK IN A ROLLED TUBE/TUBEPLATE JOINT

[75] Inventor: Son Le Mong, Baden, Switzerland

[73] Assignee: BBC Brown, Boveri & Company, Limited, Baden, Switzerland

[21] Appl. No.: 686,898

[22] Filed: Dec. 27, 1984

[30] Foreign Application Priority Data

Nov. 7, 1984 [CH] Switzerland ............ 5326/84

[51] Int. Cl.⁴ ........................... B23K 31/00
[52] U.S. Cl. .................. 228/119; 228/168; 228/183; 29/157.4
[58] Field of Search .......... 228/119, 168, 169, 183; 29/157.4

[56] References Cited

U.S. PATENT DOCUMENTS

| 3,120,400 | 2/1964 | Carpenter | 29/157.4 X |
| 3,540,529 | 11/1970 | Umino et al. | 29/157.4 X |
| 3,608,173 | 9/1971 | Watson et al. | 228/183 X |

Primary Examiner—Kenneth J. Ramsey
Attorney, Agent, or Firm—Oblon, Fisher, Spivak, McClelland & Maier

[57] ABSTRACT

The process steps for sealing a leak in rolled tube/tubeplate joints in heat exchange units comprise removing a portion of the tube end (2) and of the tube-plate (1) by a milling cut (6) and joining the surfaces thus formed by a weld seam (7) of preferably lens-shaped cross-section.

3 Claims, 8 Drawing Figures

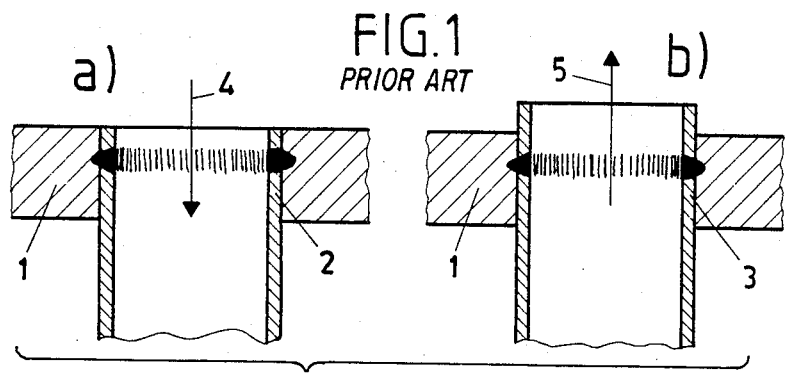
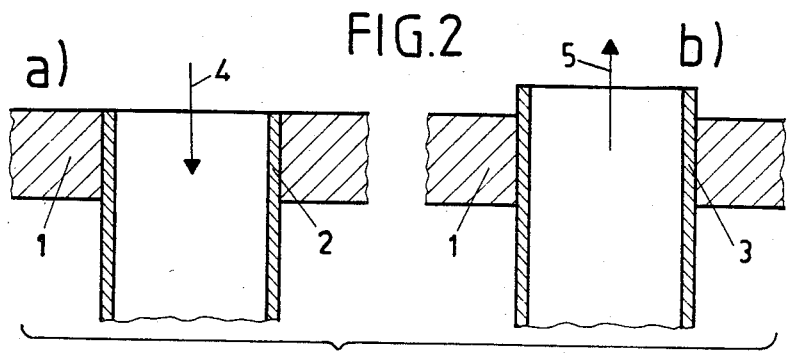
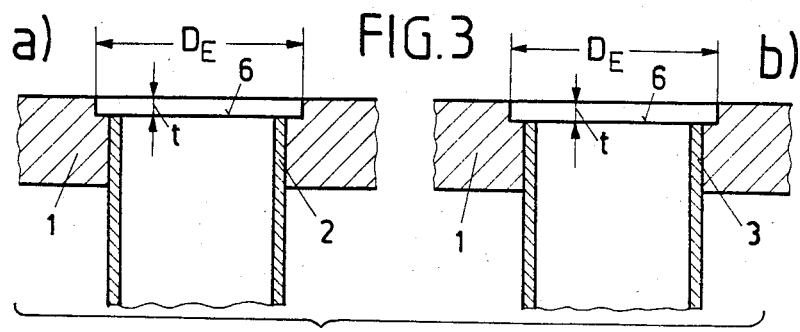
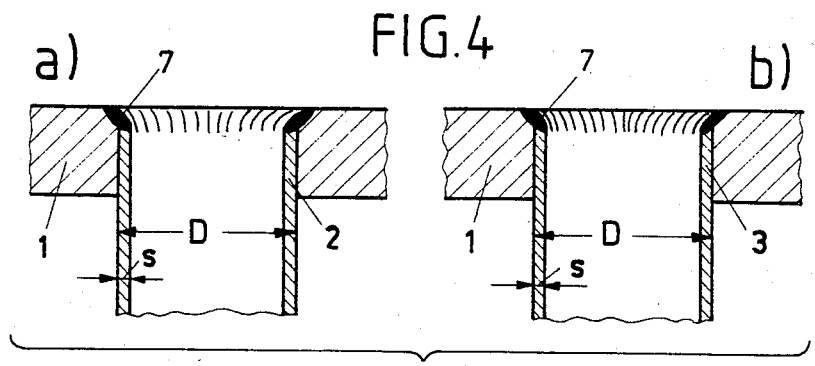

PROCESS FOR SEALING A LEAK IN A ROLLED TUBE/TUBEPLATE JOINT

FIELD OF THE INVENTION

The present invention relates to a process for sealing a leak in a rolled tube/tubeplate joint.

BACKGROUND OF THE INVENTION

In heat exchange units with tubes as the partitions between the two media concerned in the heat exchange, the ends of the tubes, through which the first of the two media flows, are anchored in tubeplates in a manner producing a seal. These tubeplates form partitions between a middle housing part, through which the second medium flows, and one chamber each for the inlet and outlet of the first medium. In low-pressure heat exchange units, for example condensers and low-pressure preheaters, the ends of the heat exchanger tubes are usually rolled into holes in the said tubeplates.

If a tube/tubeplate joint of this type starts to leak, it is as a rule attempted to eliminate this leak by re-rolling the tube ends. In most cases, this is successful if this leak is the first to occur. On repeated re-rolling, however, it is not always possible to seal the leaking areas, since the tubes can then start to crack due to excessive expansion. In these cases, attempts have hitherto been made to restore leak-tightness by means of a weld running around the inner periphery of the tube, the tube material throughout its wall thickness and the adjacent region of the tubeplate material being fused during the weld. Since, however, it is not possible completely to remove the deposits in the narrow gap between the tube and tubeplate, a perfect weld is also not always possible, so that leaks cannot always be eliminated with certainty in its way.

OBJECT OF THE INVENTION

It is the principal object of the present invention to weld the ends of the leaking tubes to the tubeplate in such a way that further leakages can be prevented with certainty.

BRIEF DESCRIPTION OF THE DRAWINGS

The invention is described below in more detail by reference to the drawing.

FIG. 1a shows a tube end, rolled into a tubeplate and rewelded in the known manner, on the inlet side of a condenser.

FIG. 1b shows the same for a tube end on the outlet side.

FIGS. 2a–4b each show a leaking tube end, on the inlet side and outlet side respectively, in the tubeplate of a condenser, in three different stages of the repair.

DETAILED DESCRIPTION OF THE PRESENTLY PREFERRED EMBODIMENT

In all the figures, 1 represents a section of a tubeplate in a condenser, 2 represents the inlet end of a heat exchanger tube, and 3 represents the outlet end of a heat exchanger tube. These illustrations and the process steps described below apply analogously also to other low-pressure heat exchange units with the ends of the heat exchanger tubes rolled into tubeplates.

FIGS. 1a and 1b show a conventional type of repair of tube ends which have been rolled into a tubeplate 1 and have started to leak. As mentioned in the introduction, such a repair weld in the rolling-in region does not guarantee leak-tightness. The flow directions of the medium flowing through the heat exchanger tubes are indicated by the flow arrows 4 and 5. To reduce the flow resistance, the inlet tube end 2 terminates flush with the outer boundary surface of the tubeplate 1, whereas the outlet tube end 3 can protrude beyond this boundary surface. In this way, narrow tolerances, which would otherwise be necessary for tube ends with flush termination, for the length of the heat exchanger tubes are avoided, and the losses due to eddy formation in the issuing flow are hardly greater than those in the case of tube ends terminating flush with the tubeplate.

The sealing process according to the invention is explained by reference to FIGS. 2a–4b.

FIGS. 2a and 2b show two tube ends which are to be sealed, at the inlet and outlet ends of a heat exchanger tube respectively. The first repair step is shown in FIGS. 3a and 3b. In both cases, the tube end is milled off down to a depth t into the tubeplate. The diameter $D_E$ of this milling cut 6 is to be selected such that a weld seam 7 of approximately elliptical cross-section can be made at its edge, as can be seen from FIGS. 4a and 4b. The diameter $D_E$ of the milling cut 6 will preferably be made with $D_E = D + 2s$, wherein D and s, respectively, are the external diameter and the wall thickness of the heat exchanger tube. With these dimensions, the weld seam is likely to be fused equally well to the end face of the tube end and to the tubeplate. As a minimum dimension of the depth t of the milling cut 6, t=s may be assumed. In this case, the weld seam forms a rheologically favourable inlet for the medium.

In order to prevent welding faults due to deposits, which may be present in the rolled joint, as far as possible, the rolling gap between the tube end and tubeplate is preferably blown with a highly superheated steam jet before welding. The milling cut is then thoroughly dried in order to prevent formation of blisters in the weld seam.

The advantages of such a repair are that the still existing rolled joint is hardly affected by the weld. In conjunction with the weld, the load-bearing capacity of the tube/tubeplate joint is thus increased. The elliptical cross-section of the weld seam 7 results, as stated, in a rheologically favourable inlet for the medium flowing into the tubes, whereby dirt deposits in the inlet region and its surroundings are prevented and the corrosion risk is consequently reduced. Any welding faults are immediately detectable and can be remedied by rewelding, even before a leakage test.

I claim:

1. Process for sealing a leak in a rolled tube/tubeplate joint, in which the end (2; 3) of a heat exchanger tube is non-positively fixed in a hole in a tubeplate (1), serving as a partition in a heat exchange unit, by radial expansion by means of a rolling-in tool with pressure prestressing, the leak being eliminated by welding, characterized in:

(a) that, at the end face of the tube end (1; 2), a milling cut (6) is made which is coaxial to the longitudinal axis of the heat exchanger tube and the diameter ($D_E$) of which is greater by substantially twice the wall thickness (s) of the heat exchanger tube than the external diameter (D) of the latter, so that an annular portion is milled out of the tubeplate around the tube end;

(b) that the end face of the tube end (1; 2) is joined by a weld seam (7) to the surface formed by the milling cut (6) in the tubeplate (1);
(c) that the weld seam (7) is made with a lens-shaped cross-section; and
(d) that the depth (t) of the milling cut (6) is substantially equal to the wall thickness (s) of the heat exchanger tube.

2. Process according to claim 1, characterised in that the joint between the periphery of the tube end (2; 3) and the tubeplate (1) is blown with superheated steam and the blown area is dried before welding.

3. A process for sealing a leak in a rolled tube/tubeplate joint, said process comprising the steps of:
(a) milling a cut:
   (i) which is coaxial to the longitudinal axis of the tube;
   (ii) the diameter of which is greater by at least substantially twice the wall thickness of the tube than the external diameter of the tube; and
   (iii) the depth of which is at least substantially equal to the wall thickness of the tube,
thereby forming an annular, inwardly stepped face composed of the end of the tube and the adjacent surface of the tubeplate, and
(b) welding the end of the tube to the adjacent surface of the tubeplate in the annular, inwardly stepped face with a weld seam having a lens-shaped cross-section.

* * * * *